United States Patent [19]

Eckardt

[11] 4,134,687

[45] Jan. 16, 1979

[54] CONTROL OF PLASTIC INJECTION

[75] Inventor: Helmut Eckardt, Hilchenbach-Allenbach, Germany

[73] Assignee: Schloemann-Siemag AG, Düsseldorf, Germany

[21] Appl. No.: 800,055

[22] Filed: May 24, 1977

[30] Foreign Application Priority Data

May 24, 1976 [DE] Fed. Rep. of Germany ....... 2623308

[51] Int. Cl.² ............................ B29B 1/06; B29F 1/02
[52] U.S. Cl. ....................................... 366/76; 366/77; 366/96; 366/101; 366/604; 425/817 R
[58] Field of Search ............... 425/817 R, 817 C, 562, 425/4 R; 366/69, 77, 92, 96, 101, 184, 192, 193, 341, 604; 222/144.5

[56] References Cited

U.S. PATENT DOCUMENTS 3,947,175  3/1976  Melcher .................. 222/144.5 X

FOREIGN PATENT DOCUMENTS 2346135  4/1975  Fed. Rep. of Germany ...... 425/817 R
 98977  8/1975  Japan ................................. 425/817 C
571945  1/1976  Switzerland ....................... 425/817 R Primary Examiner—Philip R. Coe
Attorney, Agent, or Firm—Norman S. Blodgett; Gerry A. Blodgett

[57] ABSTRACT

Apparatus for injecting thermoplastic material including means to form a tubular stream of plastic with a central stream containing a foaming agent.

14 Claims, 7 Drawing Figures

CONTROL OF PLASTIC INJECTION

BACKGROUND OF THE INVENTION

In the fabrication from thermoplastic materials of massive, thick-walled molded parts with a smooth surface, it is known, in order to prevent of cave-in spots, which occur during cooling of an injected compact plastic mass, to provide the inside of the molded part with a plastic mass, containing a foaming agent. By means of this compact mass, the outer skinforming plastic mass is pressed constantly against the inside surface of the mold during the cooling procedure.

It is known, for example, from German patent No. 1,778,457 that one can inject into a mold, a charge of non-foaming mass which does not fill the mold and which is a compact thermoplastic mass; then, before hardening of the center, one can inject a second charge of thermoplastic containing the foaming agent into the center of the first charge. In that way, the mass of the second charge (containing the foaming agent) presses equally on all sides towards the inside of the mold. Thereafter, a small amount of plastic mass may be injected into the mold.

By extending this procedure, it has been made known through German petty patent No. 2 241 002 to inject simultaneously a charge with and without the mass containing the foaming agent after the injection of the first charge to form a smooth surface for the molded part. The plastic mass containing the foaming agent flows into the mold through a central jet, and the compact material forming the smooth outer surface enters the mold through a ring jet surrounding the center jet.

The apparatus for executing this procedure is normally equipped with two separate extruders. In one of the extruders prepares the plastic containing the foaming agent and in the other extruder is prepared the dense plastic mass. The liquid forming the gaseous foaming agent is already mixed into the plastic mass within the extruder. The use of two extruders makes the apparatus quite complicated and expensive.

When a dense plastic mass and a mass containing the foaming agent is injected into the mold one after the other, then it is possible to use only the extruder which delivers dense plastic mass. Shortly after the start of the injection procedure, a predetermined amount of dense plastic is already within the mold cavity. The foaming agent is added to the stream of compact flowing mass in the portion between the extruder and the mold cavity. The disadvantage exists, however, that the total cross-section of the flow canal is filled with the plastic mass containing the foaming agent and, during flushing with compact plastic, the plastic containing foaming agent is not completely removed. This will influence the surface quality of the next molded part. In addition, a thorough mixing of the compact plastic mass with the foaming agent becomes difficult and an exact metering of the plastic mass containing the foaming agent is not possible.

It is, therefore, an outstanding object of the invention to provide apparatus for the discontinuous fabrication of the molded parts made from thermoplastics, which parts have a smooth surface and a porous core, whereby the use of only one extruder allows the simultaneous injection of dense plastic and plastic containing forming agent, thus permitting a good mixing as well as exact metering of the plastic containing the foaming agent.

With this and other objects in view, as will be apparent to those skilled in the art, the invention resides in the combination of parts set forth in the specification and covered by the claims appended hereto.

SUMMARY OF THE INVENTION

In general, the apparatus constructed in accordance with the present invention makes it possible to subdivide a compact plastic stream coming from the extruder, without special redirection into a core stream and at least into one tubular stream, then to mix one inner stream with a foaming agent and, thereafter, to inject these streams simultaneously into the mold. With this method there is always a stream carrying foaming agent surrounded by a dense plastic stream. According to demand, it is now possible before and/or after the simultaneous injection phase to guide only a small amount of the dense plastic mass into the molding tool. Through this procedure, molded parts which have a satisfactory smooth outer surface and a porous inside core are produced by smallest machine technical usage.

DESCRIPTION OF THE PREFERRED EMBODIMENT

Figure 1:
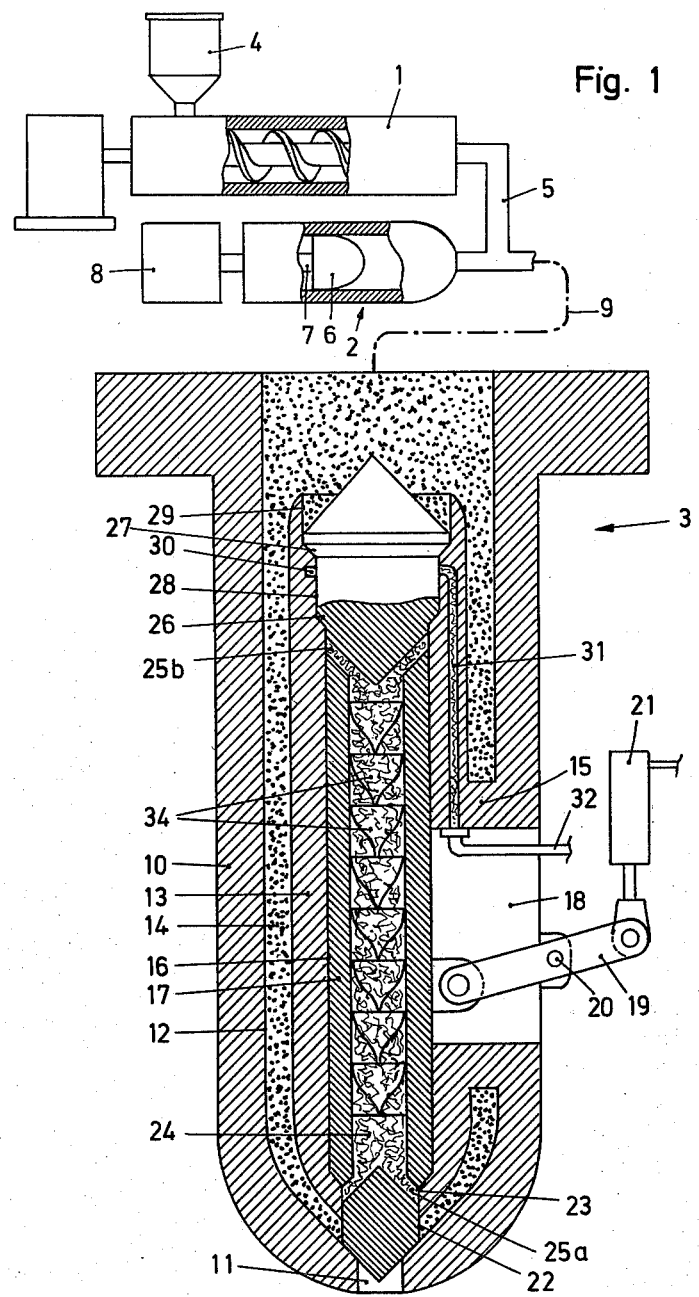
FIG. 1 is a schematic view of apparatus for the execution of the procedure with the jet closed.

FIG. 1 shows apparatus for the discontinuous fabrication of molded parts made from thermoplastic plastic, each part having a smooth outer surface and a porous core. The apparatus consists mainly of a plastification unit 1, an intermediate storage container 2 and an injection head 3 attachable to the mold not shown. The plastification unit 1 is shown in this example as a conveyor extruder, in which raw thermoplastic material, coming from the hopper 4 as granulers, transferred into the plastic state and is guided through the conduit 5 to the intermediate storage container 2. The intermediate storage container 2 normally consists of a piston-cylinder unit wherein the push-out piston 6 is retracted by the pressure of the entering plastic mass. As soon as a predetermined amount of the plasticized plastic mass (which amount is adjustable in a known manner by means of the piston rod 7 of the intermediate storage 2 control system) is inside the intermediate storage container 2, a displacement drive 8 connected to the piston rod 7 is switched on and guides the plasticized mass to the injection head 3. The injection head 3 may be connected directly to the intermediate storage container 2 or (as indicated in the drawings) connected to it through a conduit 9. The injection head consists largely of a cylindrical housing 10 which is equipped with a jet tip on the end opposite the attachment to the intermediate storage 2. The jet tip is rounded at the exit opening 11. The housing 10 has a central bore 12 which is cylindrical for most of its length and on its jet tip end is reduced at the exit opening 11. Inside the cylindrical bore 12 is arranged a tubular shaft 13 whose outer diameter is smaller than the diameter of the bore 12, so that a canal 14 is created between the housing 10 and the shaft 13, the canal being of ring-shaped cross-section. The shaft 13 is maintained inside the bore 12 by at least one web 15. The shaft 13 has a cylindrical bore 16 through most of its length, which serves to carry a closure pin 17. The closure pin 17 is displacable axially within the bore 16 of shaft 13. For this purpose, an opening 18 is formed in the housing 10 that continues through the web 15 and the shaft 13 and is lined up with a linkage lever 19 which extends through it. This lever 19 is supported on an axis 20 fixedly carried outside of the housing 10 and the lever is connected at the other end to a controllable adjustable drive 21, such as a piston-cylinder unit.

Figure 3:
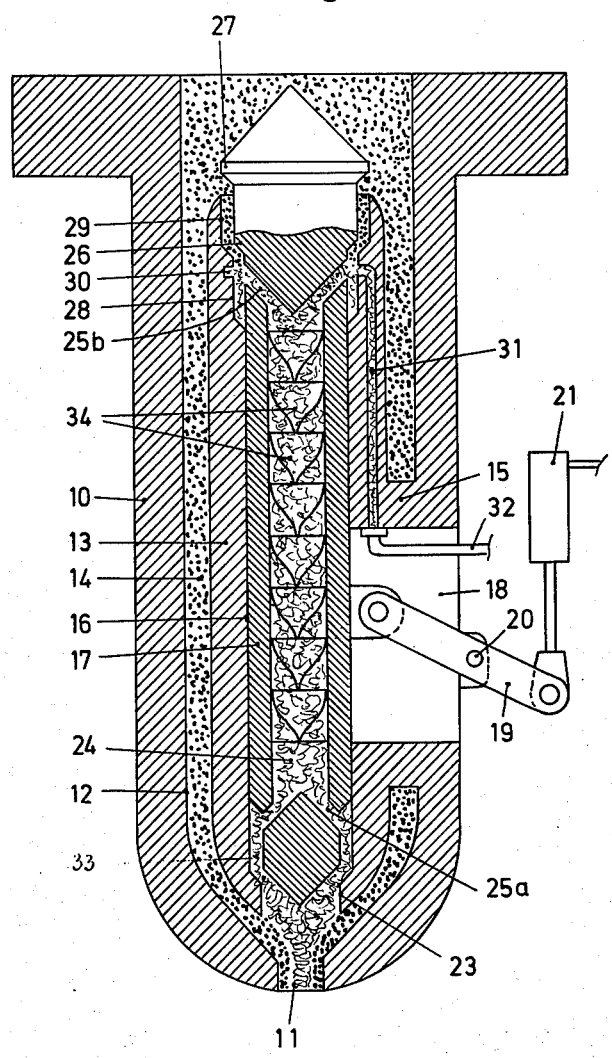

The closure pin 17 has a tip 22 on the end facing the exit opening 11 which tip is guided in a reduced exit opening 23 of the shaft 13. In the position shown in FIG. 1, (the so-called "closure" position of the pin 17) the pin extends with its tip 22 over the shaft, so that the connection between the canal 14 and the exit opening 11 is interrupted. Furthermore, the closure pin 17 contains an axial canal 24 which ends some distance in front of the two ends of closure pin 17. On the other end of the canal 24 facing the exit opening 11 are arranged several sloped overflow canals 25a which end (as shown in the "closure" position of the pin 17 in FIG. 1) on the wall of the exit opening 23 and is only free of the wall in the postion of the closure pin shown in FIG. 3. Similar overflow canals 25b are also located at the other end of canal 24, but have a slope opposite to that of canals 25a. The overflow canals 25b end (in the closure position of the pin 17) at the inside wall of the shaft 13. At this end, the closure pin 17 has two circumferential extrusions which engage corresponding expansions 28, 29 of the shaft 13, as shown in FIG. 1. In the vicinity of the expansion 28, an annular canal 30 is formed in the wall of the shaft 13 and is connected to a canal 31. The canal 31 ends in the opening 18 and is connected there with a line 32 which again is connected to a metering device (not shown here) for liquid and gaseous foaming agent.

In the operation of the described apparatus, let us assume that the closure pin 17 is positioned as shown in FIG. 1 (based on a previous operating cycle). The canal 14 is filled with the dense plastic mass and the canal 24 is filled with the plastic mass containing the foaming agent. As soon as the intermediate storage container 2 is filled with the required amount of plasticized plastic mass from the extruder for one filling of the mold, the adjusting drive 21 is placed under pressure before energizing the displacement drive 8 and the closure pin 17 is moved into the position shown in FIG. 2. With this position of the closure pin 17, the connection between the canal 14 and the exit 11 is opened, so that the dense plastic may be transported from the intermediate storage container 2 into the mold, not shown. In this position of the closure pin 17, the overflow canals 25a reach into a still-closed annular space 23 between the closure pin 17 and the shaft 13. At the same time, a connection is created through the overflow canals 25b from canal 24 to the ring-shaped expansion 28.

This position of the closure pin 17 is maintained for only a short time, and only in case a determined compact mass is to be pre-injected into the molding tool. In the position of the closure pin 17 shown in FIG. 3, achieved by the adjusting drive 21, the annular space 33 towards exit opening 11 is opened (on the one hand) and (on the other hand) the extension 27 outside of the shaft 13 is located in such a way that the compact plastic mass can now reach into the centrally-located canal 24 of the closure pin 17 through the expansion 28, 29 and the overflow canals 25b. As soon as this flow connection is made, foaming agent will be introduced into the flowing compact plastic mass by means of the line 32, the canal 31, and the annular canal 30. To achieve a good mixing of the foaming agent and the plastic mass, several commonly-known mixing plates 34 are arranged within the canal 24. The plates are arranged spirally and are displaced by 90° relative to each other. By means of the overflow canals 25a, the plastic mass containing the foaming agent now leaves the canal 24 and is surrounded in the area of the exit opening 11 by a tubular dense plastic flow.

Figure 2:
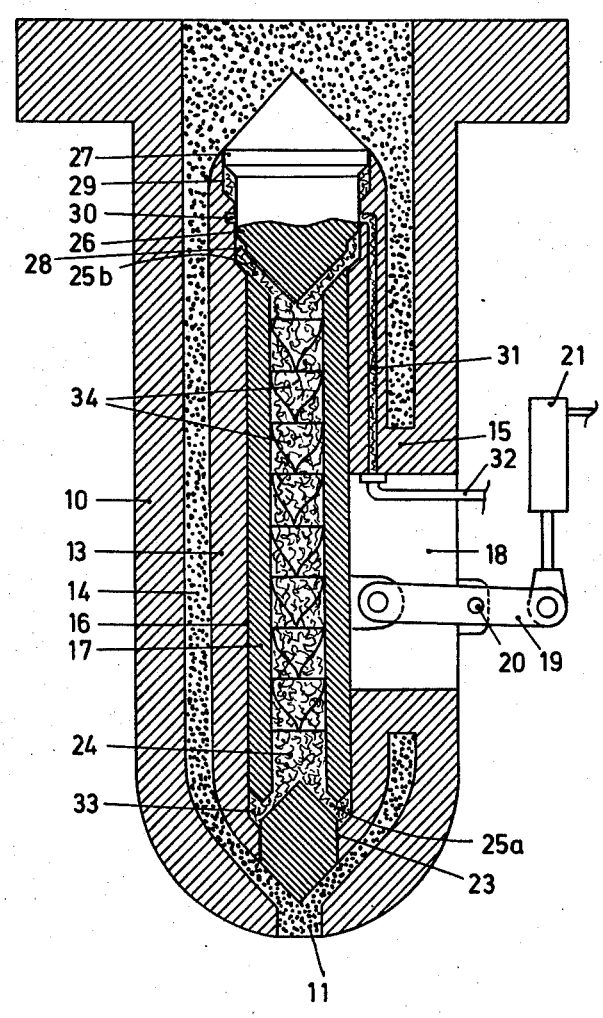
FIG. 2 shows the jet shown in FIG. 1 in its half-open position, FIG. 3 show the jet of FIG. 1 in its fully-opened postion.

As soon as sufficient amount of plastic containing foaming agent is inside the mold, the closure pin 17 is brought back into the position shown in FIG. 2 and the transmission of the plastic containing the foaming agent is ended. Now only the dense plastic is flowing into the mold until the intermediate storage container 2 is completely emptied. With the complete emptying of the intermediate storage container 2, the closure pin 17 is retracted to its starting position, as shown in FIG. 1. Thereafter, the described filling operation of the mold is repeated.

By varying the opening stroke of the closure pin 17, the relationship of the dense plastic mass to the plastic mass containing the foaming agent may be changed without difficulty. In a variation of this design example, it is possible to displace the closure pin 17 during the start of mold filling operation immediately from the position of FIG. 1 to the position of FIG. 2; that is to say, no dense mass is pre-injected into the mold tool, but dense and plastic mass containing foaming agent flows simultaneously into the mold. Also, during the end of the mold filling operation, the closure pin 17 may be brought immediately from the position of FIG. 3 into the position of FIG. 1. Thereafter, no dense plastic mass may enter the mold, but only the so-called end mass.

Figure 4:
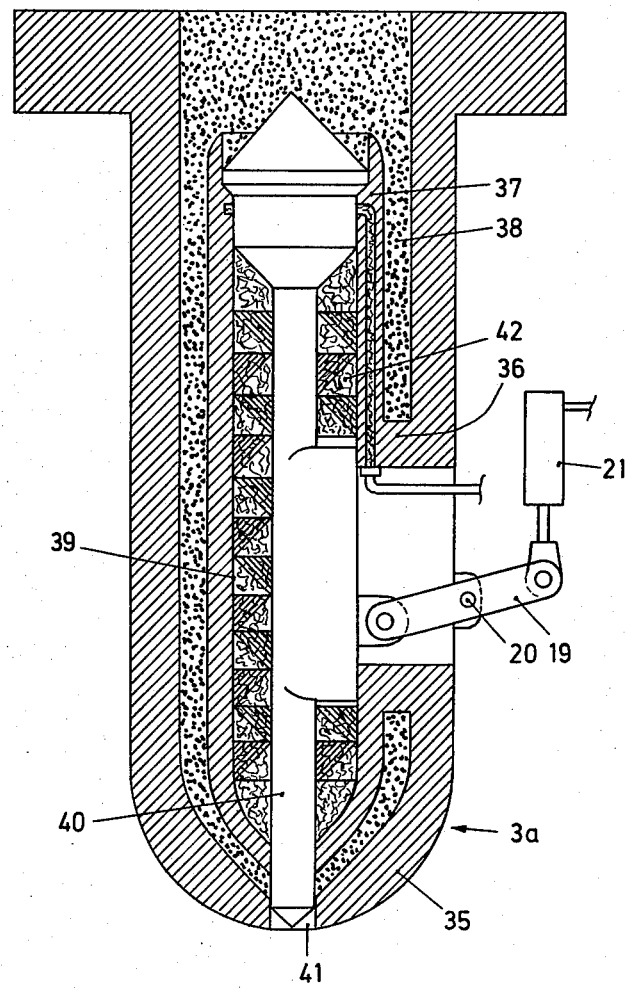
FIG. 4 shows a modified form of the jet.

The injection head shown in FIG. 4 has also a housing 35 in which a shaft is kept in place by at least one web 36 in such a way that a canal 38 of ring-shaped cross-sectional area is created between the shaft 37 and the housing 35. The shaft also has a cylindrical bore 39 extending through the larger part of its length, which bore incorporates a closure pin 40. In contrast to the previously-described design, the closure pin does not completely fill the bore 39. The closure pin 40 acts in relationship to the bore 39 to obstruct only the inlet and outlet. In addition, the closure pin 40 also closes the exit opening 41 at the jet tip. Extending over a large area between the closure pin 40 and shaft 37, an annular space 42 is formed in this design example in which mixing plates are arranged. In this jet head 3a, by complete opening of closure pin 40, the dense plastic mass also flows into the annular space 42, where the plastic mass will be mixed with the foaming agent in the manner already explained.

Figure 5:
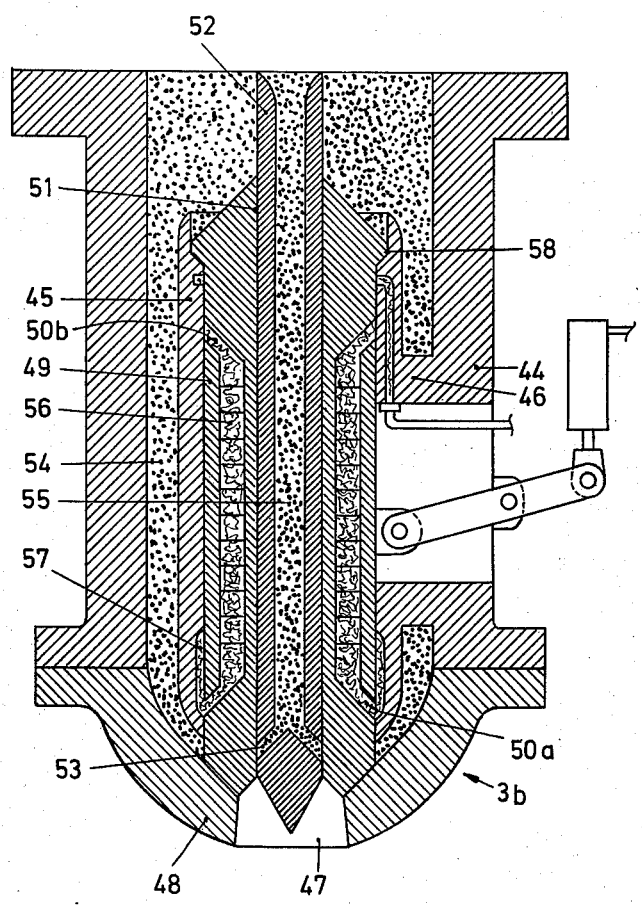
FIG. 5 shows a further modification of the jet in closed position.
Figure 6:
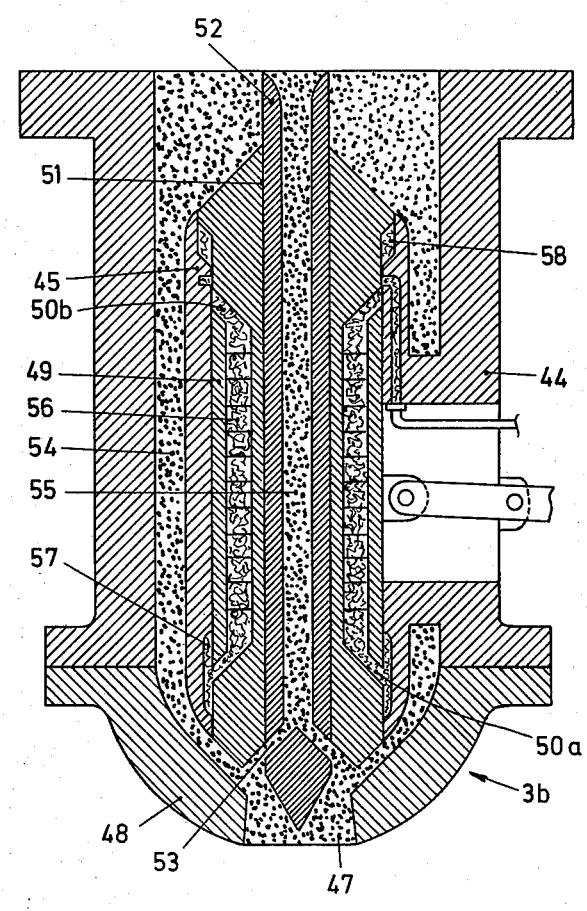
FIG. 6 shows the jet of FIG. 5 in half-opened position.
Figure 7:
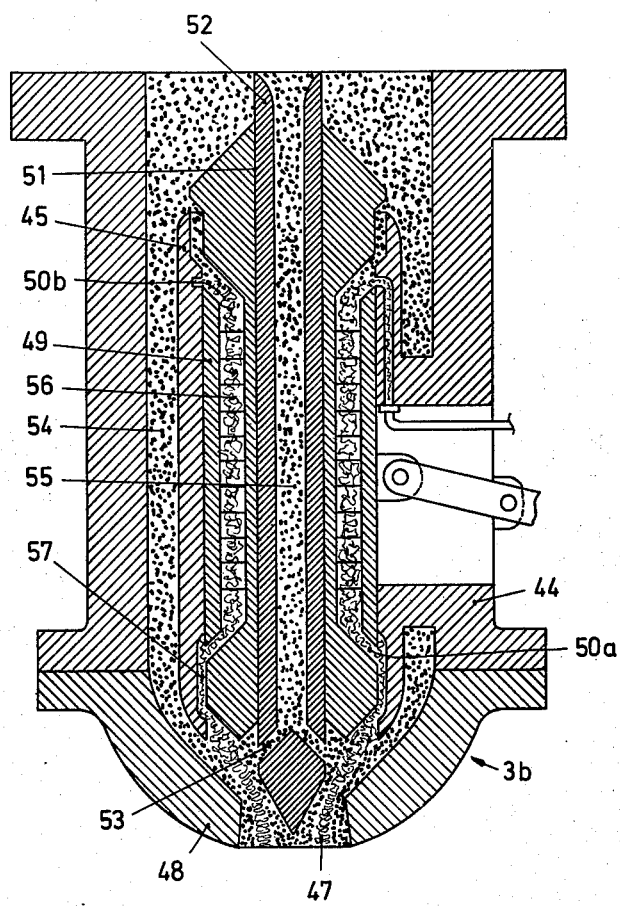
FIG. 7 shows the jet of FIG. 5 in fully-opened position.

FIGS. 5 to 7 show another form of the injection head 3b, which also may be connected to the intermediate storage 2 through a conduit, as shown in FIG. 1. This injection head 3b has a housing 44 with a shaft 45, which in this design example is fabricated in one piece along with a connector web 46. The outlet opening 47 is formed in a jet tip 48 which is mounted on the housing 44 and may be fastened with bolts, for example. Into the shaft 45 is arranged a displaceable closure pin 49, which is generally similar to the closure pin 17 of FIGS. 1 to 3. In this case also, overflow canals 50a and 50b are formed on both ends. In contrast to the design of the closure pin 17, the closure pin 49 has a bore 51 extending all the way through into which is inserted a sleeve 52. The sleeve 52 is closed on the end facing the outlet opening and overflow canals 53 arranged in this area, which canals are closed by the inside wall of the closure pin 49, as shown in FIG. 5. The sleeve 52 is fixedly mounted within the housing 44 and is connected to the housing 44 by webs which are not shown. The postion of the sleeve 52 within housing 44 may be displaced in the axial direction, depending on the plastic material to influence the division of the plastic mass which is introduced.

The description of operation of the apparatus shown in FIGS. 5 to 7 is based upon the fact that the closure pin 49 takes the position shown in FIG. 5. From a previous cycle, the annular space 54 surrounding the shaft 45, as well as the bore 55 within the sleeve 52 is filled with the dense plastic mass. The annular space 56 within the closure pin 49 is filled with plastic mass containing the foaming agent. To introduce the injection operation, the closure pin 49 is pushed into the postion shown in FIG. 6, so that the compact mass now reaches the outlet opening 47 through the annular space 54, through the bore 55 within the sleeve 52, and through the overflow canals 53. This position of the closure pin 49 is selected in such a way that the dense plastic is pre-injected into the mold. Additionally, the enlargement 58 is connected with the overflow canals 50b.

In the position of the closure pin 49 shown in FIG. 7, the dense plastic may also reach the annular space 56. To this plastic mass, foaming agent is added as previously explained. In this annular space 56 mixing elements are also arranged. The plastic mass containing foaming agent may now reach the outlet opening 47 through the overflow canals 50a, as well as the ring-shaped recess 57 in the shaft 45. The plastic stream flowing through the outlet opening 47 now inherits a core and a outer ring from the dense plastic mass, as well as an intermediate ring of plastic mass containing foaming agent. Shortly before the end of the injection operation, the metering pin 49 may briefly take the position of FIG. 6, so that a small amount of dense plastic may be injected thereafter.

In a variation of this design, it is possible to push the closure pin 49 immediately from the postion of FIG. 5 to the position of FIG. 7.

The design of FIGS. 5 to 7 indicates how the housing 44 and the injection tip 48 can be formed in two parts. A corresponding, but also simpler solution for the fabrication is indicated in FIGS. 1 to 4.

In spite of the fact that the procedure of this invention has been explained in connection with the fabrication of molded parts by discontinous operation, it is also possible to operate continuously. The inside design of the injection heads may then be simplified.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Injection molding apparatus for the injection molding of bodies consisting of a foamed porous thermoplastic core and a non-foamed dense thermoplastic skin, by injecting foaming and non-foaming thermoplastic material into a hollow-molding tool comprising:
   (a) an injection head having an inlet opening for receiving a stream of non-foamed thermoplastic material during the injection operation, and an outlet opening,
   (b) an annular canal within the injection head, said canal being ring-shaped in cross section and having an outlet opening and an inlet opening connected to the inlet opening of the injection head,
   (c) a central bore within and co-axial with the annular canal, the central bore having an inlet opening, an outlet opening, and a mixing chamber between the inlet and outlet openings of the central bore,
   (d) means for connecting the inlet opening of the central bore to the inlet opening of the injection head,
   (e) a pipe line carrying a foaming agent and having an outlet opening communicating with the central bore between the mixing chamber and the inlet opening of the central bore and having an inlet opening,
   (f) means slidable axially within the central bore for selectively connecting and disconnecting the outlet opening of the pipe line with the central bore,
   (g) means for mixing the thermoplastic material and foaming agent within the mixing chamber,
   (h) means for connecting and disconnecting the outlet openings of the annular canal and central bore to the outlet opening of the injection head.

2. Injection molding apparatus as recited in claim 1, wherein the injection head has a main bore and a stationary tubular central shaft extending within the main bore, said central bore being located within the central shaft and said annular canal extending around the outer periphery of the central shaft.

3. Injection molding apparatus as recited in claim 2, wherein the means for connecting the inlet opening of the central bore to the inlet opening of the injection head and the outlet opening of the pipe line with the central bore comprises a tubular closure pin guided within the central bore and containing the mixing chamber, the closure pin and the shaft having areas which cooperate for selectively connecting and disconnecting the mixing chamber to the inlet opening of the central bore.

4. Injection molding apparatus as recited in claim 3, wherein the closure pin and the shaft have areas which cooperate for selectively connecting and disconnecting the mixing chamber to the outlet opening of the central bore.

5. Injection molding apparatus as recited in claim 4, wherein the closure pin comprises means for selectively connecting the outlet opening of the canal to the outlet opening of the injection head.

6. Injection molding apparatus as recited in claim 4, wherein the closure pin comprises means for selectively connecting the outlet opening of the central bore to outlet opening of the injection head, the connection of the outlet opening of the central bore to the outlet opening of the injection head and the connection of the outlet opening of the mixing chamber to the outlet opening of the central bore occurring simultaneously.

7. Injection molding apparatus as recited in claim 3, wherein the mixing chamber is centrally located within the closure pin and is circular in cross section.

8. Injection molding apparatus as recited in claim 7, comprising spirally-arranged mixing plates within the mixing chamber.

9. Injection molding apparatus as recited in claim 3, wherein the mixing chamber of the closure pin is ring-shaped in cross section.

10. Injection molding apparatus as recited in claim 9, wherein the closure pin has an axial bore within the mixing chamber, said molding apparatus comprising a sleeve slidable in the axial direction within the axial bore and fixedly connected to the injection head.

11. Injection molding apparatus as recited in claim 10, wherein the sleeve has an inlet opening connected to the inlet opening of the injection head and an outlet opening adapted to be connected to the outlet opening of the injection head by the means for connecting the outlet opening of the annular canal to the outlet opening of the injection head.

12. Injection molding apparatus as recited in claim 2, wherein the central bore is ring-shaped in cross section.

13. Injection molding apparatus as recited in claim 12, wherein the means for connecting the inlet opening of the central bore to the inlet opening of the injection head and the outlet opening of the pipe line with the central bore comprises a closure pin movable axially relative to the central shaft, the closure pin constituting the central core of the ring-shaped central bore.

14. Injection molding apparatus as recited in claim 13, wherein the closure pin also forms the means for connecting the outlet openings of the annular canal and central bore to the outlet opening of the injection head.

* * * * *